(12) United States Patent
Furukawa

(10) Patent No.: US 10,550,814 B2
(45) Date of Patent: Feb. 4, 2020

(54) CHARACTERISTIC DETERMINING APPARATUS AND CONTROL DEVICE USING SAME

(71) Applicant: DENSO CORPORATION, Kariya, Aichi-pref. (JP)

(72) Inventor: Takashi Furukawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 55 days.

(21) Appl. No.: 15/641,926

(22) Filed: Jul. 5, 2017

(65) Prior Publication Data

US 2018/0010565 A1    Jan. 11, 2018

(30) Foreign Application Priority Data

Jul. 7, 2016   (JP) .................... 2016-134714

(51) Int. Cl.
| | |
|---|---|
| *F02M 65/00* | (2006.01) |
| *F02D 41/30* | (2006.01) |
| *F02M 55/00* | (2006.01) |
| *F02M 57/00* | (2006.01) |
| *F02M 63/00* | (2006.01) |
| *F02D 41/40* | (2006.01) |

(52) U.S. Cl.
CPC ......... *F02M 65/00* (2013.01); *F02D 41/3005* (2013.01); *F02D 41/40* (2013.01); *F02M 55/00* (2013.01); *F02M 55/008* (2013.01); *F02M 57/005* (2013.01); *F02M 63/0031* (2013.01); *F02M 65/001* (2013.01); *F02M 65/003* (2013.01); *F02D 2200/0602* (2013.01); *F02D 2200/0616* (2013.01); *F02D 2200/0618* (2013.01); *F02D 2400/08* (2013.01); *F02M 2200/247* (2013.01); *Y02T 10/44* (2013.01)

(58) Field of Classification Search
CPC .................. F02D 2200/0618; F02D 2200/247
USPC ...................................................... 73/114.51
See application file for complete search history.

(56) References Cited

U.S. PATENT DOCUMENTS

| | | | | |
|---|---|---|---|---|
| 3,949,713 | A | * | 4/1976 | Rivere .................. F02M 51/00 123/458 |
| 4,109,669 | A | * | 8/1978 | Rivere .................. F02M 51/00 123/458 |
| 4,418,673 | A | * | 12/1983 | Tominari ................ F02D 43/00 123/399 |

(Continued)

FOREIGN PATENT DOCUMENTS

JP          2013-177823 A        9/2013

*Primary Examiner* — Kevin R Steckbauer
(74) *Attorney, Agent, or Firm* — Oliff PLC

(57) ABSTRACT

A characteristic determining device is provided which determines fuel injection characteristics of a plurality of fuel injectors for an internal combustion engine. The characteristic determining device includes a pressure sensor and a plurality of pipes each of which connects between the pressure sensor and one of the fuel injectors. The pressure sensor is designed to have a plurality of pressure inputs from the respective fuel injectors through the pipes and outputs a signal indicative of a level of pressure in each of the fuel injectors. The characteristic determining device analyzes the signals from the first pressure sensor to determine the fuel injection characteristics of the respective fuel injectors. These arrangements result in a simplified structure of the characteristic determining device and a decreased manufacturing cost thereof.

21 Claims, 11 Drawing Sheets

(56) References Cited

U.S. PATENT DOCUMENTS

| | | | | |
|---|---|---|---|---|
| 4,421,088 A * | 12/1983 | Seilly | .................. | F02D 41/3818 |
| | | | | 123/447 |
| 7,588,016 B2 * | 9/2009 | Pauer | ................. | F02M 51/0603 |
| | | | | 123/456 |
| 7,810,472 B2 * | 10/2010 | Kondo | ................... | F02M 53/00 |
| | | | | 123/456 |
| 7,873,460 B2 * | 1/2011 | Nakata | .................. | F02D 41/222 |
| | | | | 123/457 |
| 7,963,155 B2 * | 6/2011 | Kondo | ................. | F02M 47/027 |
| | | | | 73/114.43 |
| 8,437,942 B2 * | 5/2013 | Nakata | ................ | F02D 41/3809 |
| | | | | 701/103 |
| 8,919,186 B2 * | 12/2014 | Kondo | ................ | F02M 47/027 |
| | | | | 73/114.51 |
| 9,588,016 B2 * | 3/2017 | Ishizuka | ............. | F02D 41/3809 |
| 2008/0184962 A1 * | 8/2008 | Pauer | ................ | F02M 51/0603 |
| | | | | 123/457 |
| 2008/0228374 A1 * | 9/2008 | Ishizuka | ............. | F02D 41/3809 |
| | | | | 701/103 |
| 2009/0063013 A1 * | 3/2009 | Nakata | ................ | F02D 41/3809 |
| | | | | 701/103 |
| 2009/0082941 A1 * | 3/2009 | Nakata | .................. | F02D 41/222 |
| | | | | 701/103 |
| 2009/0241650 A1 * | 10/2009 | Kondo | ................ | F02M 47/027 |
| | | | | 73/114.43 |
| 2009/0241907 A1 * | 10/2009 | Kondo | ................... | F02M 53/00 |
| | | | | 123/470 |
| 2009/0248276 A1 * | 10/2009 | Kondo | ................ | F02M 57/005 |
| | | | | 701/103 |
| 2009/0326788 A1 * | 12/2009 | Yuasa | ................ | F02D 41/3809 |
| | | | | 701/104 |
| 2012/0245824 A1 * | 9/2012 | Miura | .................... | F02D 41/22 |
| | | | | 701/104 |

\* cited by examiner

US 10,550,814 B2

CHARACTERISTIC DETERMINING APPARATUS AND CONTROL DEVICE USING SAME

CROSS REFERENCE TO RELATED DOCUMENT

The present application claims the benefit of priority of Japanese Patent Application No. 2016-134714 filed on Jul. 7, 2016, the disclosure of which is incorporated herein by reference.

BACKGROUND

1 Technical Field

The invention relates generally to a characteristic determining apparatus working to determine fuel injection characteristic of fuel injectors which may be employed in internal combustion engines for automobiles.

2 Background Art

Japanese Patent First Publication No. 2009-57924 teaches a characteristic determining device working to determine fuel injection characteristics of fuel injectors which spray fuel into an internal combustion engine. The characteristic determining device is equipped with a plurality of pressure sensors which are mounted in a delivery pipe one for each of the fuel injectors. Each of the pressure sensors measures a pressure level in one of the fuel injectors when being opened to spry the fuel. The characteristic determining device analyzes an output from each of the fuel injectors to determine the fuel injection characteristics of the fuel injector.

The characteristics determining device, as described above, uses the plurality of pressure sensors in measuring the pressure of fuel in the respective fuel injectors, thus resulting in complicated layout of lead wires extending from the pressure sensors. The pressure sensors are designed to output a signal indicating absolute values of pressure in the fuel injectors, thereby resulting in an increase in manufacturing cost of the characteristic determining device.

SUMMARY

It is therefore an object to provide a characteristic determining apparatus which has a simplified structure to determine fuel injection characteristics of a plurality of fuel injectors and a control device using the same.

According to one aspect of the disclosure, there is provided a characteristic determining device which determines fuel injection characteristics of a plurality of fuel injectors working to spray fuel in a delivery pipe into an internal combustion engine. The characteristic determining device comprises: (a) a plurality of pipes each of which has a length with a first end and a second end and communicates at the first end with an inside of one of the fuel injectors; (b) a first pressure sensor to which the second ends of at least two of the pipes are joined and which is responsive to a pressure in each of the at least two of the pipes to output a signal as a function of an internal injector pressure that is a pressure of fuel in a corresponding one of the fuel injectors; and (c) a characteristic determiner which analyzes the signal, as outputted from the first pressure sensor, to determine fuel injection characteristics of a corresponding one of the fuel injectors.

The first pressure sensor, as described above, has at least two of the pipes joined thereto. In other words, the single first pressure sensor is used for a plurality of fuel injectors. This results in a simplified structure and decreased manufacturing costs of the characteristic determining device as compared with the prior art structure in which a plurality of pressure sensors are used one for each fuel injector.

The characteristic determining device may be equipped with a second pressure sensor which measures the pressure in the delivery pipe. The use of the second pressure sensor enables the first pressure sensor to be implemented by a differential pressure sensor. The first pressure sensor needs not measure an absolute value of pressure in each of the fuel injectors, thereby enabling the first pressure sensor to be designed to have a relatively narrow measurable range, which leads to a decrease in manufacturing cost of the characteristic determining device. The use of the differential pressure sensor as the first pressure sensor also enables the measurable range to be increased, thereby enhancing the accuracy in measuring the internal injector pressures.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Embodiments will be described below with reference to the drawings. Throughout the drawings, the same reference numbers refer to the same parts, and explanation thereof in detail will be omitted.

First Embodiment

The fuel injection system 1 is equipped with a characteristic determiner and control device according to the first embodiment.

Specifically, the fuel injection system 1 is installed in a vehicle such as an automobile, not shown. The fuel injection system 1 is engineered to control spraying or injecting of fuel or gasoline into the engine 10 (i.e., an internal combustion engine) mounted in the vehicle. The engine 10 is, for example, an in-line four-cylinder gasoline engine.

Figure 1:
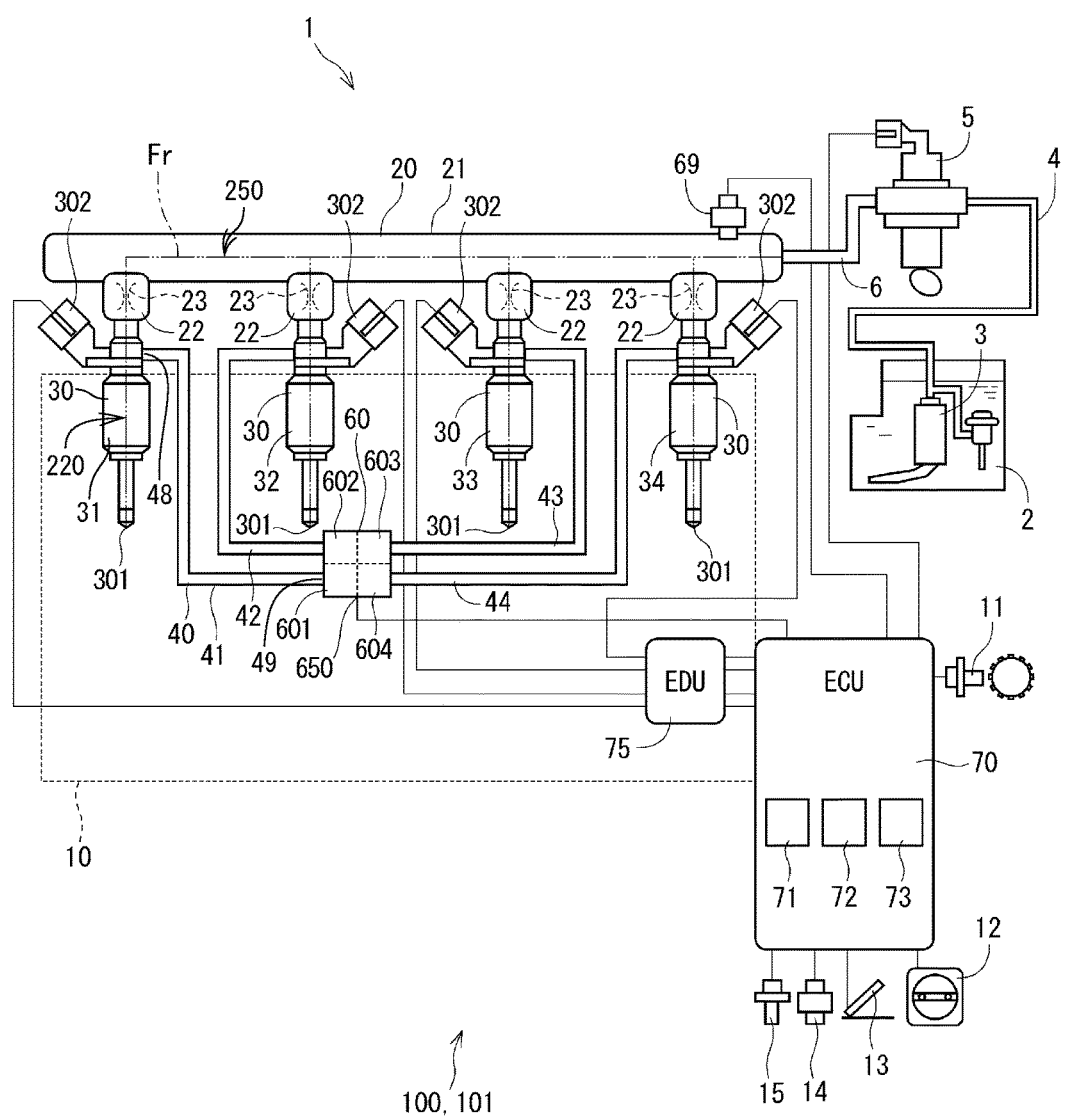
FIG. 1 is a block diagram which illustrates a fuel injection system equipped with a characteristic determining device and a control device according to a first embodiment.

The fuel injection system 1 is, as illustrated in FIG. 1, equipped with the fuel tank 2, the fuel pump 3, the pipe 4, the high-pressure pump 5, the pipe 6, the delivery pipe 20, the fuel injectors 30, the characteristic determining device 100, and the control device 101.

The fuel tank 2 stores gasoline (i.e., fuel) therein. The fuel pump 3 is installed in the fuel tank 2 and works to suck fuel from the fuel tank 2 and deliver it to the high-pressure pump 5 through the pipe 4. The high-pressure pump 5 is driven by, for example, rotation of cams of the engine 10 to pressurize fuel delivered from the fuel pump 3 and output it. The fuel outputted from the high-pressure pump 5 is supplied to the delivery pipe 20 through the pipe 6.

The delivery pipe 20 is made from, for example, metallic material and includes the pipe body 21 and a plurality of (four) cups 22. The pipe body 21 is of a hollow cylindrical shape and has a given length. The pipe body 21 has closed ends. The cups 22 are of a cup-shape and arranged at equal intervals away from each other along the length of the pipe body 21. The cups 22 are brazed or welded to the pipe body 21 and have inner chambers leading to an inner chamber of the pipe body 21.

The delivery pipe 20 has four fuel injectors 30 joined thereto. The fuel injectors 30 are provided one for each cylinder of the engine 10. In the following discussion, reference numbers 31, 32, 33, and 34 will also be added to the fuel injectors 30, respectively, for the sake of ease of explanation.

Each of the fuel injectors 30 has at least one spray hole 301 formed in a head thereof. Each of the fuel injectors 30 also has a needle, not shown, which closes the spray hole 301 when a drive signal is not inputted to the fuel injector 30, in other words, the fuel injector 30 is deenergized. When the drive signal is inputted to the fuel injector 30, so that the fuel injector 30 is energized, it opens the spray hole 301. The fuel injectors 30 are, thus, made of normally closed type valves.

Each of the fuel injectors 30 has a base end which is farther away from the spray hole 301 and joined to one of the cups 22. The fuel injectors 31, 32, 33, and 34 are arranged in this order and joined to the cups 22. Each of the fuel injectors 30 is equipped with the connector 302 which is disposed near the base end thereof and through which the drive signal is inputted to the fuel injector 30.

Each of the fuel injectors 30 is joined to the engine 10 along with the delivery pipe 20 to have the spray hole 301 exposed to a combustion chamber of the engine 10. When opened, each of the fuel injectors 30 sprays fuel, as supplied from the delivery pipe 20, into the combustion chamber through the spray hole 301. The engine 10 is of a direct-injection type.

The pipe 6 is joined to an end of the pipe body 21 of the delivery pipe 20, so that fuel, as delivered from the high-pressure pump 5, is inputted to the pipe body 21. The delivery pipe 20 stores therein fuel outputted from the high-pressure pump 5, so that inner pressure in the delivery pipe 20 and the fuel injectors 30 is kept at high levels when the fuel injectors 30 are closed. When opened, the fuel injectors 30 spray fuel at a high pressure level.

Each of the cups 22 has formed therein the orifice 23 (i.e., a small port) which serves as a flow restrictor (also called a flow limiter) to restrict a flow of fuel in the fuel path Fr extending from inside the delivery pipe 20 to the spray hole 301 of each of the fuel injectors 30. The fuel path Fr includes the first sections 220 (i.e., a downstream section) and the second section 250 (i.e., an upstream section). The first sections 220 lead to the spray holes 301 of the respective fuel injectors 30. The second section 250 extends from inside the deliver pipe to upstream ends of the first sections 220. Therefore, when each of the fuel injectors 30 sprays the fuel, the pressure of fuel in a corresponding one of the first sections 220 (i.e., the downstream section) of the fuel path Fr extending between the orifice 23 and the spray hole 301 of the fuel injector 30 will drop, while the pressure of fuel in the second section 250 (i.e., the upstream section) of the fuel path Fr extending upstream of the orifice 23 hardly drops.

The characteristic determining device 100 and the control device 101 are equipped with four pipes 40, the first pressure sensor 60, the second pressure sensor 69, the electronic control unit 70 (which will also be referred to below as an ECU) 70, and the electronic drive unit (which will also be referred to below as an EDU) 75. The four pipes 40 will also be denoted below by numerals 41, 42, 43, and 44 for the sake of ease of explanation.

The pipes 40 are made of, for example, metallic material and of a hollow cylindrical shape. Each of the pipes 40, as can be seen in FIG. 1, has a length with the first end 48 and the second end 49 opposed to the first end 48 and is joined at the first end 48 to an end portion of a corresponding one of the fuel injectors 30 which is farther away from the spray hole 301. Specifically, each of the pipes 40 is joined to a portion of the fuel injector 30 which is diametrically opposed to the connector 302, so that the inside of the pipe 40 communicates with that of the fuel injector 30. The first end 48 of each of the pipes 40 is connected to the downstream section of the fuel path Fr which is closer to the spray hole 301 than the orifice 23 is. The pipes 41, 42, 43, and 44 are joined at the first end 48 thereof to the fuel injectors 31, 32, 33, and 34, respectively.

When the fuel injectors 30 are secured to the engine 10, the first ends 48 of the pipes 40 and the connectors 302 of the fuel injectors 30 are exposed outside the engine 10.

In this embodiment, the pipes 40 all have the same length between the first ends 48 and the second ends 49.

Figure 2:
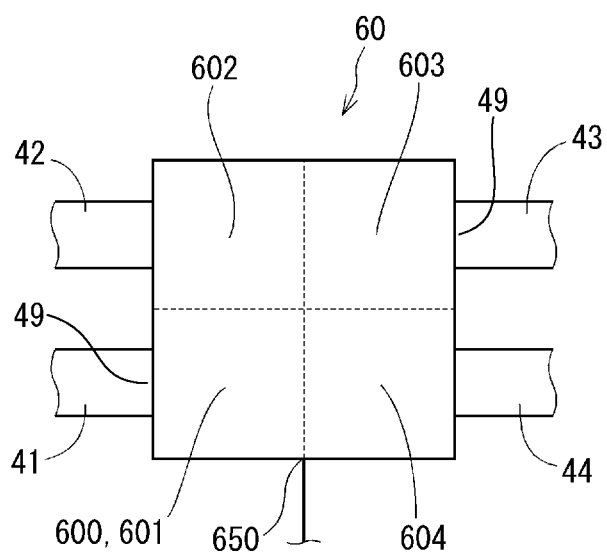
FIG. 2 is a partial schematic view which illustrates an internal structure of a first pressure sensor installed in the characteristic determining device of FIG. 1.

The pipes 41, 42, 43, and 44, as can be seen in FIG. 2, have the second ends joined to the first pressure sensor 60. The first pressure sensor 60 has formed therein four inner chambers which are isolated from each other and each of which is connected to one of the pipes 41 to 44, so that the pipes 41 to 44 do not communicate with each other and thus fuel does not flow from one of the pipes 41 to 44 to another. When the characteristic determining device 100 is in operation, the pipes 40 are filled with fuel.

The first pressure sensor 60 has four input ports 600 and one output port 650. The input ports 600 will also be denoted below by numeral 601, 602, 603, and 604 for the sake of ease of explanation.

The input ports 601, 602, 603, and 604 are, as can be seen in FIG. 2, defined by the four isolated inner chambers of the first pressure sensor 60, respectively. The pipes 41, 42, 43, and 44 are joined at the second ends thereof to the input ports 601, 602, 603, and 604, respectively, so that internal pressure of each of the fuel injectors 31, 32, 33, and 34 (which will also be referred to below as internal injector pressure) is inputted to a corresponding one of the input ports 601, 602, 603, and 604 through a corresponding one of the pipes 41, 42, 43, and 44.

As apparent from the above discussion, the fuel injection system 1 is equipped with the single first pressure sensor 60 and the four pipes 40 joined at the second ends thereof to the first pressure sensor 60.

The output port 650 of the first pressure sensor 60 is electrically connected to the ECU 70 which will be described below in detail. The output port 650 works to output a signal indicative of a pressure difference $\Delta P$ among the input ports 601, 602, 603, and 604 to the ECU 70.

Specifically, if levels of pressure inputted to the input ports 601, 602, 603, and 604 are represented by P1, P2, P3, and P4, respectively, the pressure difference $\Delta P$ is given by one of the following equations.

$$\Delta P = P1 - (P2 + P3 + P4)/3 \text{ when } P2 = P3 = P4 \quad (1)$$

$$\Delta P = P2 - (P1 + P3 + P4)/3 \text{ when } P1 = P3 = P4 \quad (2)$$

$$\Delta P = P3 - (P1 + P2 + P4)/3 \text{ when } P1 = P2 = P4 \quad (3)$$

$$\Delta P = P4 - (P1 + P2 + P3)/3 \text{ when } P1 = P2 = P3 \quad (4)$$

The first pressure sensor 60 is, therefore, implemented by a differential pressure sensor and works to output a signal indicating a difference in internal injector pressure among the fuel injectors 30 to which the pipes 40 are joined at the first ends 48. The fuel injectors 30 are controlled by the controller 73 to have injection durations which are out of coincidence with each other. When, for example, the fuel injector 31 has started spraying the fuel, the pressure inputted to the input port 601 will drop, but the other fuel injectors 32 to 34 are kept closed, so that pressures inputted to the input ports 602 to 604 remain unchanged and thus be equal to each other. Therefore, when the fuel injector 31 is spraying the fuel, the first pressure sensor 60 outputs a signal indicating a difference between a pressure level in the fuel injector 31 and a pressure level in any one of the fuel injectors 32 to 34 (i.e., an average of pressure levels in the fuel injectors 32 to 34). In this embodiment, a measurable range of the first pressure sensor 60 is between 0 to 1 Mpa.

In other words, the first pressure sensor 60 is engineered to output from the output port 650 a signal as a function of a result of comparison of a change in pressure of fuel inputted to one of the input ports 600 which arises from the spraying of fuel from one of the fuel injectors 30 with pressures inputted to the other input ports 600. Specifically, the first pressure sensor 60 has strain sensors (e.g., strain gauges) attached to partition walls, respectively, which isolate the four inner chambers (i.e., the four input ports 600) from each other. The strain sensors output signals indicative of strain on the partition walls, respectively. The first pressure sensor 60 uses the outputs from the strain sensors to calculate the above described pressure difference which is in turn outputted from the output port 650.

The second pressure sensor 69 is installed in the pipe body 21 of the delivery pipe 20. The second pressure sensor 69 is electrically connected to the ECU 70. The second pressure sensor 69 measures an internal pressure of the pipe body 21 (which will also be referred to as an internal pipe pressure) and outputs a signal indicative thereof to the ECU 70. Specifically, the second pressure sensor 69 outputs the signal indicative of an absolute value of a pressure level in the pipe body 21 to the ECU 70. In this embodiment the second pressure sensor 69 is designed to have a measurable range of 0 to 100 MPa.

The first pressure sensor 60 and the second pressure sensor 69 have a response frequency of 20 kHz or more.

The ECU 70 is implemented by a microcomputer made up of a CPU working as an arithmetic circuit, a ROM, a RAM, and an I/O. The ECU 70 analyzes outputs from various sensors installed in the vehicle and execute programs stored in the ROM to control operations of various devices mounted in the vehicle.

The ECU 70 includes the characteristic determiner 71, the offset corrector 72, and the controller 73 which may be realized by either software or hardware.

The vehicle is equipped with the crank angle sensor 11, the throttle position sensor 12, the accelerator position sensor 13, the pressure sensor 14, and the water temperature sensor 15.

The crank angle sensor 11 works to output a signal indicative of an angular position of a crankshaft of the engine 10 to the ECU 70. The ECU 70 analyzes the output from the crank angle sensor 11 to calculate the angular position of the crankshaft to determine the number of revolutions or rotational speed of the engine 10.

The throttle position sensor 12 works to output a signal indicative of a rotational position (i.e., an open position) of a throttle valve installed in an intake passage, not shown, to the ECU 70. The ECU 70 analyzes the output from the throttle position sensor 12 to determine the open position of the throttle valve.

The accelerator position sensor 13 works to output a signal indicative of an open position of an accelerator pedal which is depressed by a vehicle driver to the ECU 70. The ECU 70 analyzes the output from the accelerator position sensor 13 to determine the open positon of the accelerator pedal which represents a driver's pedal effort on the accelerator pedal.

The pressure sensor 14 is installed in the intake passage and works to output a signal indicative of pressure in the intake passage to the ECU 70. The ECU 70 analyzes the output from the pressure sensor 14 to calculate the pressure of intake air flowing through the intake passage (which will also be referred to below as an intake pressure).

The water temperature sensor 15 works to output a signal indicative of the temperature of cooling water or coolant in the engine 10 to the ECU 70. The ECU 70 analyzes the output from the water temperature sensor 15 to calculate the temperature of the coolant and the temperature of the engine 10.

The controller 73 of the ECU 70 analyzes outputs from the crank angle sensor 11, the throttle position sensor 12, the accelerator position sensor 13, the pressure sensor 14 the water temperature sensor 15, or other sensors to calculate a required quantity of fuel to be injected to the engine 10 and also determines the injection timing when the fuel should be sprayed from each of the fuel injectors 30 and the injection duration for which each of the fuel injectors 30 should be kept opened. The controller 73 outputs instruction signals indicative of the injection timing and the injection duration for each of the fuel injectors 30 to the EDU 75.

The EDU 75 is electrically connected to the ECU 70 and the connectors 302 of the fuel injectors 30. The EDU 75 is responsive to the instruction signal from the ECU 70 to produce a drive signal and outputs the drive signal to each of the fuel injectors 30. Each of the fuel injectors 30 is opened in response to input of the drive signal to spray the fuel from the spray hole 301.

By the operations of the ECU 70 and the EDU 75, the fuel is sprayed from the fuel injectors 30 according to driver's intention and an operating condition of the engine 10, thereby driving the engine 10.

In this embodiment, the controller 73 of the ECU 70 controls operation timings of the fuel injectors 30 so that the fuel injectors 31, 33, 34, and 32 are opened in this order in order not to overlap the injection timings with each other. Two or more of the fuel injectors 30, therefore, do not simultaneously spray the fuel. Typically, when an internal combustion engine is operating, two or more fuel injectors are simultaneously opened to spray fuel.

When a component such as a needle of the fuel injectors 30 is aged so that it is mechanically worn or deposits are accumulated in the spray holes 301, it may cause the fuel injectors 30 to operate in a way different from before or the quantity of fuel sprayed from the fuel injectors 30 (which will also be referred to below as a fuel injection quantity) to change even when the same drive signals are inputted to the fuel injectors 30. This causes the injection timing or the quantity of fuel sprayed by the fuel injectors 30 to be different from when the fuel injectors 30 are in mint condition, which may lead to a risk that the engine 10 fails to be controlled accurately.

In order to alleviate the above problem, the characteristic determiner 71 of this embodiment is engineered to analyze the output from the first pressure sensor 60 indicative of the internal injector pressure to determine fuel injection characteristics representing how the fuel injectors 30 behave or spray the fuel. Specifically, the characteristic determiner 71 determines the fuel injection characteristics of the fuel injectors 30 using the output of the first pressure sensor 60 indicating the internal injector pressure and the output of the second pressure sensor 69 indicating the internal pipe pressure.

More specifically, when, for example, the fuel injector 31 sprays fuel in response to the drive signal, so that the pressure in the input port 601 of the first pressure sensor 60 starts to change, the characteristic determiner 71 analyzes the output from the first pressure sensor 60 to determine an injection timing (i.e. an injection start time when the fuel has started to be sprayed by the fuel injector 31).

The characteristic determiner 71 also calculates an internal pressure (i.e., an absolute pressure level) in each of the fuel injectors 30 as a function of a difference $(P-\Delta P)$ between the pressure (which will also be referred to as an absolute value P) indicated by the output from the second pressure sensor 69 and the pressure difference $\Delta P$, as derived by the output from the first pressure sensor 60.

Additionally, when the drive signal has stopped from being inputted to, for example, the fuel injector 31, so that the fuel injector 31 sprays no fuel, thus causing the pressure in the input port 601 of the first pressure sensor 60 has returned back to an initial level before the fuel injector 31 starts spraying the fuel, the characteristic determiner 71 also analyzes the output from the first pressure sensor 60 to determine an injection termination timing (i.e. the time when the fuel has stopped from being sprayed by the fuel injector 31).

The characteristic determiner 71 also calculates an injection duration for which each of the fuel injectors 30 has continues to spray the fuel using the injection timing and the injection termination timing, as calculated in the above way, to determine the quantity of fuel having been sprayed in comparison with the drive signal.

The offset corrector 72 operates in the following manner. When the engine 10 and the high-pressure pump 5 are in operation, the pressure in the delivery pipe 20 is higher than or equal to a given level, and none of the fuel injectors 30 are spraying fuel, the offset corrector 72 serves to correct the output of the first pressure sensor 60 to compensate for an offset thereof from a reference value, that is, bring the output of the first pressure sensor 60 into agreement with the reference value.

The controller 73 works to control the operation of each of the fuel injectors 30 based on the fuel injection characteristics derived by the characteristic determiner 71 of the characteristic determining device 100. Specifically, the controller 73 analyzes the injection characteristics, such as the injection timing, the internal injector pressure, the injection termination timing, and the fuel injection quantity of each of the fuel injectors 30, to regulate the instruction signal to be outputted to the EDU 75 to correct the drive signal inputted to each of the fuel injectors 30. This compensates for a change in fuel injection characteristics, such as the injection timing and the fuel injection quantity, of each of the fuel injectors 30 which arises from, for example, aging of the fuel injectors 30, thereby ensuring a desired accuracy in controlling the operation of the engine 10 in the way, like immediately after the fuel injectors 30 start to be used.

Feature 1

As apparent from the above discussion, the fuel injection system 1 of this embodiment includes the characteristic determining device 100 equipped with the pipes 40, the first pressure sensor 60, and the characteristic determiner 71. The first pressure sensor 60 is joined to the second ends of at least two of the pipes 40 (i.e., all of the pipes 30 in the first embodiment) and responsive to a level of pressure in each of the at least two of the pipes 40 to output a signal indicating a level of pressure in fuel in a corresponding one of the fuel injectors 30. The characteristic determining device 100 works to analyze the outputs from the first pressure sensor 60 to determine the fuel injection characteristics on behavior of the fuel injectors 30 which work to spray the fuel from the delivery pipe 20 into the engine 10 through the spray holes 301.

Each of the pipes 40, as described above, has the first end 48 and the second end 49. The first end 48 leads to the inside of a corresponding one of the fuel injectors 30.

The first pressure sensor 60, as described above, establishes discrete connections with the second ends 49 of the pipes 40 to determine levels of pressure in the respective pipes 40 as a function of levels of pressure of fuel in the respective fuel injectors 30 (i.e., the internal injector pressures).

The characteristic determiner 71 analyzes the output from the first pressure sensor 60 indicating the internal injector pressure of one of the fuel injectors 30 to determine the fuel injection characteristics of the fuel injector 30.

As apparent from the above discussion, the first pressure sensor 60 is engineered to have the second ends 49 of the four pipes 40 joined thereto. In other words, the plurality of fuel injectors 30 share the single first pressure sensor 60 with each other. This results in a simplified structure of the fuel injection system 1 as compared with conventional structures in which a plurality of pressure sensors are used one for each fuel injector, which enables the manufacturing costs of the fuel injection system 1 to be reduced.

Feature 2

The fuel path Fr which extends from inside the delivery pipe 20 to the spray holes of the fuel injectors 30 has, as described above, the first sections 220 (i.e., the downstream sections) in each of which the pressure of fuel will drops upon spraying of the fuel from the spray hole 30 of a corresponding one of the fuel injectors 30 and the second section 250 (i.e., the upstream section) extending upstream of the orifices 23 of the fuel injectors 30. The first end 48 of each of the pipes 40 is joined to one of the first section 220 of the fuel path Fr. This enhances the accuracy of the first pressure sensor 60 in measuring the internal injector pressure.

Feature 3

Each of the pipes 40, as described already, has the first end 48 joined to one of the first sections 220 of the fuel path Fr which extend downstream of the orifices 23 of the fuel injectors 30 and in which the pressure of fuel will drop upon the spraying of the fuel from the fuel injectors 30, thereby facilitating ease with which the fuel pressure sensor 60 measures the pressure in the respective fuel injectors 30 with high accuracy.

Feature 4

The delivery pipes 20 have the cups 22 each of which is joined to the end of one of the fuel injectors 30 which is farther way from the spray hole 301. The cups 22 have the orifices 23 formed therein, respectively.

Feature 5

The fuel injection system 1 (i.e., the characteristic determining device 100) is also equipped with the second pressure sensor 69 which outputs a signal as a function of the internal pipe pressure that is the pressure of fuel in the delivery pipe 20. The characteristic determiner 71 determines the fuel injection characteristics of each of the fuel injectors 30 using the output of the first pressure sensor 60 indicating the internal injector pressure and the output of the second pressure sensor 69 indicating the internal pipe pressure.

Feature 6

The first pressure sensor 60 is, as described above, designed to produce a signal indicative of a difference in fuel pressure between each of the fuel injectors 30 and the other fuel injectors 30, in other words, a difference between a pressure in one of the input ports 600 and an average of pressures in the other input ports 600. The input ports 600 of the first pressure sensors 60 are joined to the second ends 49 of the pipes 40 leading to the first sections 220 of the fuel path Fr.

Feature 7

The fuel injection system 1 (i.e., the characteristic determining device 100) uses the second pressure sensor 69 which measure the pressure in the delivery pipe 20, thereby enabling the first pressure sensor 60 to be made of a differential pressure sensor. This eliminates the need for the first pressure sensor 60 to produce an absolute value of the fuel pressure, thereby permitting the first pressure sensor 60 to have a relatively narrow measurable range. This results in a decrease in manufacturing costs of the fuel injection system 1. The use of the differential pressure sensor as the first pressure sensor 60 enables a range in which the internal injector pressure is measured to be increased, thereby improving the accuracy in determining the internal injector pressure.

Feature 8

The first pressure sensor 60 is designed to output a signal indicative of a result of comparison of a pressure level inputted into one of the input ports 600 with pressure levels inputted to the other input ports 600. Specifically, the output port 650 of the first pressure sensor 60 produces a signal indicating a result of comparison of a change in one of four pressure levels inputted to the input ports 600 with other pressure levels. This means that the first pressure sensor 60 is implemented by a differential pressure sensor.

Feature 9

The first pressure sensor 60 is, as described above, designed to have the isolated inner chambers one joined to each of the pipes 40. Specifically, the first pressure sensor 60 has formed therein the four inner chambers which are isolated from each other and each of which is connected to one of the pipes 41 to 44, so that the pipes 41 to 44 do not communicate with each other and thus fuel does not flow from one of the pipes 41 to 44 to another. This blocks transmission of pressure pulsation occurring in one of the fuel injectors 30 upon spraying the fuel to the other fuel injectors 30, thereby ensuring desired accuracy of the first pressure sensor 60 measuring the fuel pressure.

Feature 10

The fuel does not flows from one of the pipes 40 to another, so that pressure levels in the pipes 40 are kept substantially equal to each other unless the fuel injectors 30 spray the fuel. It is, therefore, possible to use the first pressure sensor 60 designed to have a relatively narrow measurable range even in a case where the pressure in the pipes 40 becomes relatively high. This permits the manufacturing cost of the fuel injection system 1 to be reduced.

Feature 11

The pipes 40 connecting with the first pressure sensor 60 have the same length between the first ends 48 (i.e., the fuel injectors 30) and the second ends 49 (i.e., the first pressure sensor 60), thereby resulting in a decrease in phase difference of pressure pulsation transmitted to the input ports 600 of the first pressure sensor 60, which will improve the measurement accuracy of the first pressure sensor 60.

Feature 12

The fuel injection system 1 (i.e., the characteristic determining device 100) is also equipped with the offset corrector 72 which corrects an offset of an output from the first pressure sensor 60 when the engine 10 is operating. Specifically, when the engine 10 and the high-pressure pump 5 are operating, the pressure in the delivery pipe 20 is higher than or equal to a given level, and none of the fuel injectors 30 are spraying fuel, the offset corrector 72 serves to correct of an output from of the first pressure sensor 60 so as to bring it into agreement with the reference value. This ensures the stability of accuracy of an output from the first pressure sensor 60 even when the pressure in the delivery pipe 20 has changed.

Feature 13

The first pressure sensor 60 of this embodiment is designed to have a response frequency of 20 kHz or more, thereby ensuring high accuracy in measuring the pressure, and is suitable for detecting a pressure change resulting from spraying of fuel from the fuel injectors 30 within a short period of time.

Feature 14

The fuel injectors 30 are controlled so that two or more of them do not spray fuel simultaneously. This enables use of the single pressure sensor 60 for measuring the pressure in all the fuel injectors 30. The first pressure sensor 60 may, thus, be implemented by a differential pressure sensor.

Feature 15

The control device 101 is equipped with the characteristic determining device 100 and the controller 73. The controller 73 analyzes the fuel injection characteristics of the fuel injectors 30 derived by the characteristic determining device 100 to control the operations of the fuel injectors 30. This compensates for a unwanted change in the fuel injection characteristics of the fuel injectors 30 arising from aging thereof to achieve the same operations of the fuel injectors 30 and the engine 10 as those immediately before they begin to be used. The characteristic determining device 100 may have a simple structure, which enables the control device 101 to be designed to have a simple structure, thereby reducing overall manufacturing costs of the fuel injection system 1.

Feature 16

The controller 73 is engineered to control the injection timings of the fuel injectors 30 so that durations of spraying of fuel do not overlap each other. This enables use of the single first pressure sensor 60 for measuring the pressure in each of the fuel injectors 30. The first pressure sensor 60 may, thus, be implemented by a differential pressure sensor.

Second Embodiment

Figure 3:
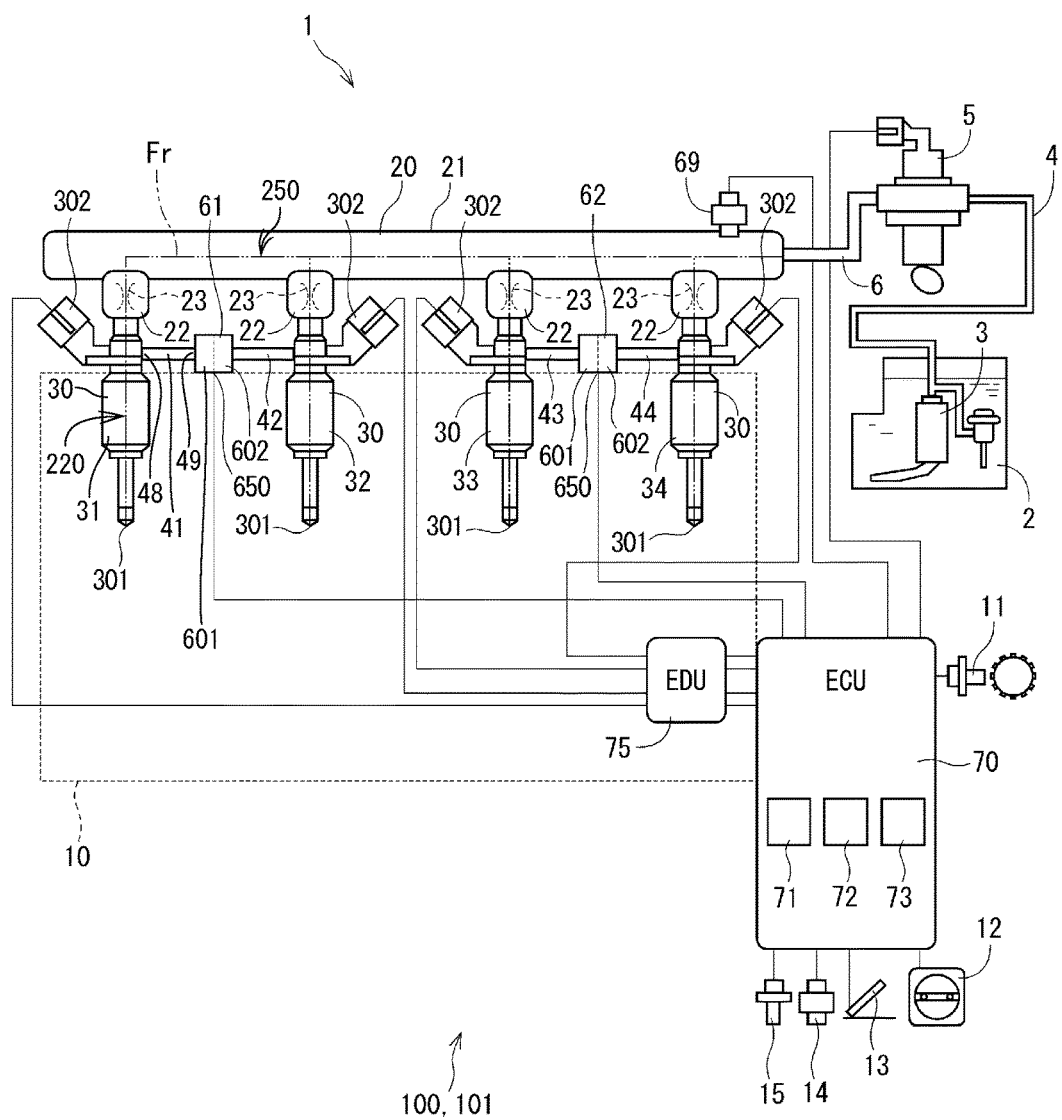
FIG. 3 is a block diagram which illustrates a fuel injection system equipped with a characteristic determining device and a control device according to a second embodiment.

FIG. 3 illustrates the fuel injection system 1 equipped with the characteristic determining device 100 and the control device 101 according to the second embodiment. The pipes 40 and the first pressure sensor 60 are different in structure from those in the first embodiment. Specifically, the characteristic determining device 100 is equipped with two first pressure sensor 60 which will also be denoted by numerals 61 and 62 for the sake of ease of explanation.

Figure 4:
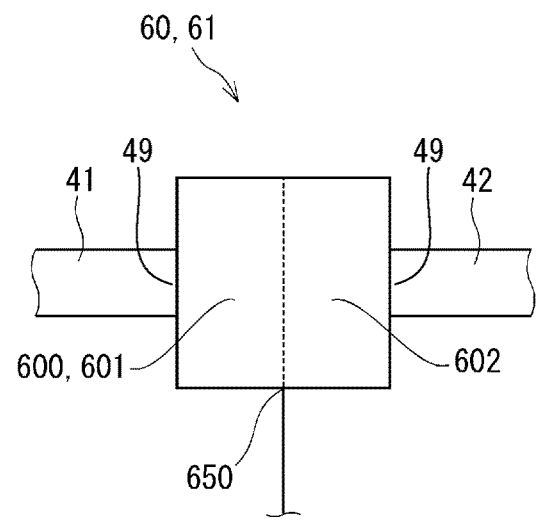
FIG. 4 is a partial schematic view which illustrates an internal structure of a first pressure sensor installed in the characteristic determining device of FIG. 3.

The first pressure sensor 61, as illustrated in FIG. 4, has the second ends 49 of the pipes 41 and 42 joined thereto. The first pressure sensor 61 has formed therein two inner chambers which are isolated from each other and define the input ports 600 to which the pipes 40 (41 and 42) lead, respectively. The pipes 41 and 42, thus, do not communicate with each other, so that fuel does not flow one of the pipes 41 and 42 to the other. Each of the pipes 40 is fully filled with fuel when the characteristic determining device 100 is in operation.

The first pressure sensor 61 is equipped with the two input ports 600 and the output port 650. The input ports 600 will also be denoted by numeral 601 and 602 for the sake of ease of explanation.

The input ports 601 and 602 are, as described above, provided by the hydraulically isolated inner chambers of the first pressure sensor 61. The pipes 41 and 42 are joined at the second ends 49 thereof to the input ports 601 and 602, respectively, so that the internal injector pressures that are pressure levels of fuel in the fuel injectors 31 and 32 are inputted to the input ports 601 and 602 through the pipes 41 and 42, respectively.

Similarly, the first pressure sensor 62 has two inner chambers which are hydraulically isolated from each other and define the input ports 600 to which the pipes 40 (43 and 44) are joined, respectively. Specifically, the first pressure sensor 62, like the first pressure sensor 61, has the two input ports 601 and 602 and the output port 650.

The input ports 601 and 602 of the first pressure sensor 62 are, like the first pressure sensor 61, provided by the hydraulically isolated inner chambers. The pipes 43 and 44 are joined at the second ends 49 thereof to the input ports 601 and 602 of the first pressure sensor 62, respectively, so that the internal injector pressures that are pressure levels of fuel in the fuel injectors 33 and 34 are inputted to the input ports 601 and 602 through the pipes 43 and 44, respectively.

As apparent from the above discussion, the characteristic determining device 100 of this embodiment is equipped with the two first pressure sensors 60 each of which is joined to two of the pipes 40.

The pipes 41 to 44 have the same length between the first ends 48 (i.e., the fuel injectors 30) and the second ends 49 (i.e., the first pressure sensors 60).

The output ports 650 of the first pressure sensors 61 and 62 are electrically connected to the ECU 70. The first pressure sensors 61 and 62 has substantially the same structure. Specifically, the output port 650 of each of the first pressure sensors 61 and 62 produces a signal as a function of a difference ($\Delta P$) between pressures inputted to the input ports 601 and 602 and outputs it to the ECU 70.

Specifically, if the pressures inputted to the input ports 601 and 602 are represented by P1 and P2, respectively, the pressure difference ($\Delta P$) is given by the following equation.

$$\Delta P = P1 - P2 \qquad (5)$$

Each of the first pressure sensors 60 is, therefore, implemented by a differential pressure sensor which is designed to output a signal indicating a difference in internal injector pressure between two of the fuel injectors 30 to which two of the pipes 40 are joined at the first ends 48 thereof.

In other words, the output port 650 of each of the first pressure sensors 60 outputs a signal indicating a result of comparison of a change in one of the two inputted pressures with the other.

Figure 5:
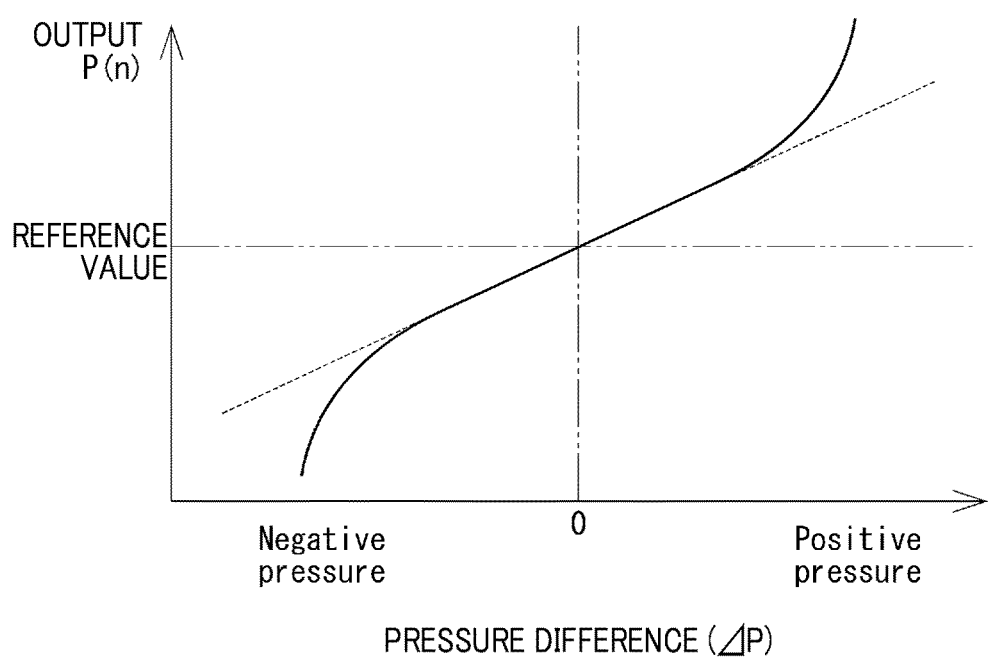
FIG. 5 is a graph which demonstrates characteristics of a signal outputted from the first pressure sensor installed in the characteristic determining device of FIGS. 3 and 4.

FIG. 5 is a graph which demonstrates, by a solid line, a characteristic of a signal outputted from the output port 650 of each of the first pressure sensors 60. The graph shows that the output of the first pressure sensor 60 has a characteristic which is point-symmetrical with each other between a positive pressure side and a negative pressure side. Specifically, the characteristic of the signal outputted from the output port 650 is symmetrical with respect to an intersection between the pressure difference ($\Delta P$) of zero and a reference value of an output P(n) that is an output level of the first pressure sensor 60. For instance, when the pressure difference ($\Delta P$) between the input port 601 and the input port 602 of the first pressure sensor 60 is zero, the signal outputted from the output port 650 indicates the reference value. When the pressure difference ($\Delta P$) is on the negative pressure side, in other words, the pressure level in the input port 602 is higher than that in the input port 601, the signal outputted from the output port 650 represents a value lower than the reference value. Alternatively, when the pressure difference ($\Delta P$) is on the positive pressure side, in other words, the pressure level in the input port 602 is lower than that in the input port 601, the signal outputted from the output port 650 represents a value higher than the reference value.

Other arrangements of the second embodiment are identical with those of the first embodiment. The characteristic determiner 71, the offset corrector 72, and the controller 73 are identical in operation with those in the first embodiment.

Figure 6:
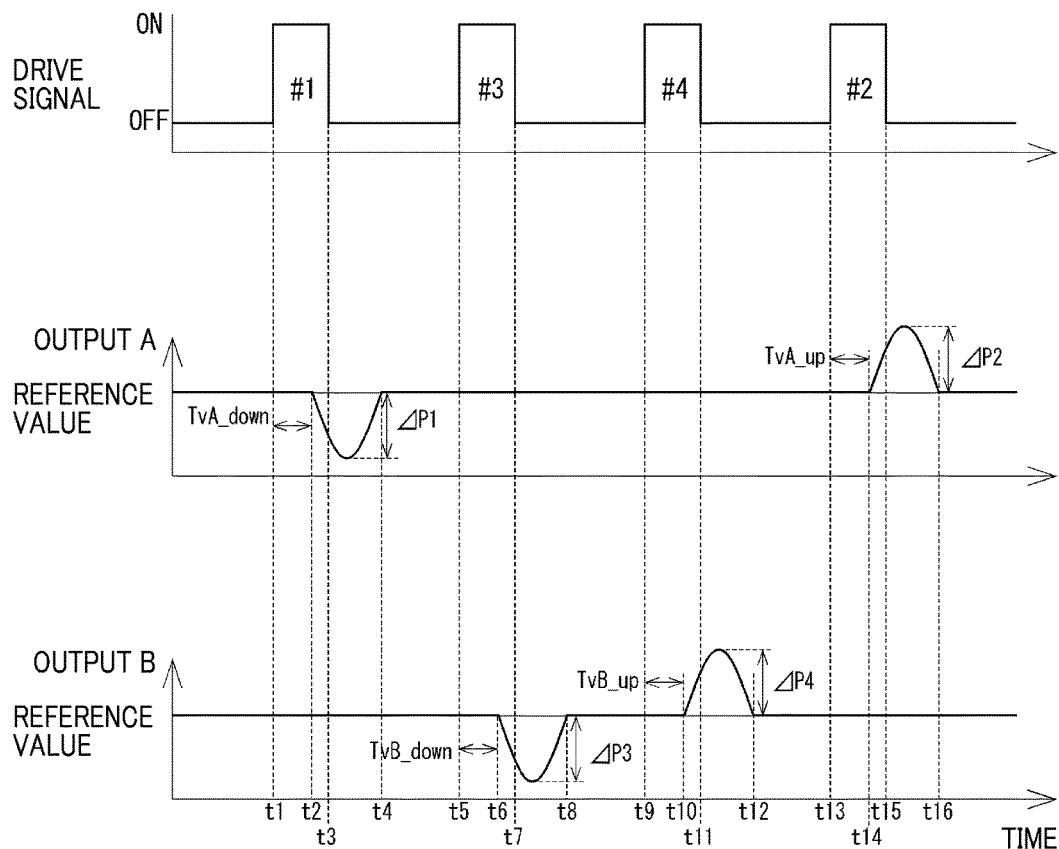
FIG. 6 is a time chart which demonstrates an operation of the characteristic determining device of FIG. 3.

The operation of the characteristic determining device 100 will be described below with reference to FIG. 6.

The output from the output port 650 of the first pressure sensor 61 is denoted by "A". The output from the output port 650 of the first pressure sensor 62 is denoted by "B".

When the drive signal inputted to the fuel injector 31 is turned on at time t1, the fuel injector 31 is opened at time t2, so the fuel injector 31 starts spraying fuel from the spray hole 301. This causes the output A to be smaller than a reference value after time t2. The characteristic determiner 71 then determines an injection timing of the fuel injector 31 (i.e., a time when the fuel injector 31 has started spraying the fuel) using a time interval (TvA_down) between times t1 and t2.

When the drive signal inputted to the fuel injector 31 is turned off at time t3, the fuel injector 31 is closed at time t4, so that the fuel injector 31 stops spraying the fuel from the spray hole 301. This causes the output A to be returned back to the reference value at time t4. The characteristic determiner 71 then determines the injection termination timing of the fuel injector 31 (i.e., the time when the fuel injector 31 has stopped spraying the fuel) based on times t2 and t4.

A difference ($\Delta P1$) between a minimum value of the output A and the reference value between times t2 and t4 corresponds to the pressure difference ($\Delta P$) between the internal injector pressure of the first injector 31 (i.e., the pressure inputted to the input port 601 of the first pressure sensor 61) when the fuel injector 31 is spraying the fuel and the internal injector pressure of the fuel injector 32 (i.e., the pressure inputted to the input port 602 of the first pressure sensor 61) between times t2 and t4.

The characteristic determiner 71 calculates an injection duration of the fuel injector 31 using the injection timing and the injection termination timing of the fuel injector 31 to determine the injection quantity (i.e., the quantity of fuel having been sprayed from the fuel injector 31) in relation to the drive signal (i.e., a pulse duration).

When the drive signal inputted to the fuel injector 33 is turned on at time t5, the fuel injector 33 is opened at time t6, so the fuel injector 33 starts spraying fuel from the spray hole 301. This causes the output B to be smaller than the reference value after time t6. The characteristic determiner 71 then determines an injection timing of the fuel injector 33 (i.e., a time when the fuel injector 33 has started spraying the fuel) using a time interval (TvB_down) between times t5 and t6.

When the drive signal inputted to the fuel injector 33 is turned off at time t7, the fuel injector 33 is closed at time t8, so that the fuel injector 33 stops spraying the fuel from the spray hole 301. This causes the output B to be returned back to the reference value at time t8. The characteristic determiner 71 then determines the injection termination timing of the fuel injector 33 (i.e., the time when the fuel injector 33 has stopped spraying the fuel) based on times t6 and t8.

A difference ($\Delta P3$) between a minimum value of the output B and the reference value between times t6 and t8 corresponds to the pressure difference ($\Delta P$) between the internal injector pressure of the first injector 33 (i.e., the pressure inputted to the input port 601 of the first pressure sensor 62) when the fuel injector 33 is spraying the fuel and the internal injector pressure of the fuel injector 34 (i.e., the pressure inputted to the input port 602 of the first pressure sensor 62) between times t6 and t8.

The characteristic determiner 71 calculates an injection duration of the fuel injector 33 using the injection timing and the injection termination timing of the fuel injector 33 to determine the injection quantity (i.e., the quantity of fuel having sprayed from the fuel injector 33) in relation to the drive signal (i.e., a pulse duration).

When the drive signal inputted to the fuel injector 34 is turned on at time t9, the fuel injector 34 is opened at time t10, so the fuel injector 34 starts spraying fuel from the spray hole 301. This causes the output B to be greater than the reference value after time t10. The characteristic determiner 71 then determines an injection timing of the fuel injector 34 (i.e., a time when the fuel injector 34 has started spraying the fuel) using a time interval (TvB_up) between times t9 and t10.

When the drive signal inputted to the fuel injector 34 is turned off at time t11, the fuel injector 34 is closed at time t12, so that the fuel injector 34 stops spraying the fuel from the spray hole 301. This causes the output B to be returned back to the reference value at time t12. The characteristic determiner 71 then determines the injection termination timing of the fuel injector 34 (i.e., the time when the fuel injector 34 has stopped spraying the fuel) based on times t10 and t12.

A difference ($\Delta P4$) between a maximum value of the output B and the reference value between times t10 and t12 corresponds to the pressure difference ($\Delta P$) between the internal injector pressure of the first injector 33 (i.e., the pressure inputted to the input port 601 of the first pressure sensor 62) when the fuel injector 34 is spraying the fuel and the internal injector pressure of the fuel injector 34 (i.e., the pressure inputted to the input port 602 of the first pressure sensor 62) between times t10 and t12.

The characteristic determiner 71 calculates an injection duration of the fuel injector 34 using the injection timing and the injection termination timing of the fuel injector 34 to determine the injection quantity (i.e., the quantity of fuel having been sprayed from the fuel injector 34) in relation to the drive signal (i.e., a pulse duration).

When the drive signal inputted to the fuel injector 32 is turned on at time t13, the fuel injector 32 is opened at time t14, so the fuel injector 32 starts spraying fuel from the spray hole 301. This causes the output A to be greater than the reference value after time t14. The characteristic determiner 71 then determines an injection timing of the fuel injector 32 (i.e., a time when the fuel injector 32 has started spraying the fuel) using a time interval (TvA_up) between times t13 and t14.

When the drive signal inputted to the fuel injector 32 is turned off at time t15, the fuel injector 32 is closed at time t16, so that the fuel injector 32 stops spraying the fuel from the spray hole 301. This causes the output A to be returned back to the reference value at time t16. The characteristic determiner 71 then determines the injection termination timing of the fuel injector 32 (i.e., the time when the fuel injector 32 has stopped spraying the fuel) based on times t14 and t16.

A difference ($\Delta P2$) between a maximum value of the output A and the reference value between times t14 and t16 corresponds to the pressure difference ($\Delta P$) between the internal injector pressure of the first injector 31 (i.e., the pressure inputted to the input port 601 of the first pressure sensor 61) when the fuel injector 32 is spraying the fuel and the internal injector pressure of the fuel injector 32 (i.e., the pressure inputted to the input port 602 of the first pressure sensor 61) between times t14 and t16.

The characteristic determiner 71 calculates an injection duration of the fuel injector 32 using the injection timing and the injection termination timing of the fuel injector 32 to determine the injection quantity (i.e., the quantity of fuel having sprayed from the fuel injector 32) in relation to the drive signal (i.e., a pulse duration).

In the above way, the characteristic determiner 71 derives the fuel injection characteristics of the fuel injectors 30 (31 to 34).

As apparent from the above discussion, the second embodiment offers the following features.

Feature 1

The four pipes 40 are provided one for each of the fuel injectors 30. The two first pressure sensors 60 are provided one for every two of the pipes 40. Every two of the pipes 40 are joined at the second ends 49 thereof to one of the first pressure sensors 60. These arrangements result in a simplified structure of the fuel injection system 1 as compared with conventional structures in which a plurality of pressure sensors are used one for each fuel injector, which enables the manufacturing costs of the fuel injection system 1 to be reduced.

Feature 2

The output characteristic of each of the first pressure sensors 60 is point-symmetrical between the positive pressure side and the negative pressure side. This facilitates ease of offset-correction of the outputs from the first pressure sensors 60 through the offset corrector 72, thereby enhancing the accuracy in determining the fuel injection characteristics of the fuel injectors 30. The controller 73 is, therefore, capable of controlling the operations of the fuel injectors 30 with high accuracy.

Third Embodiment

Figure 7:
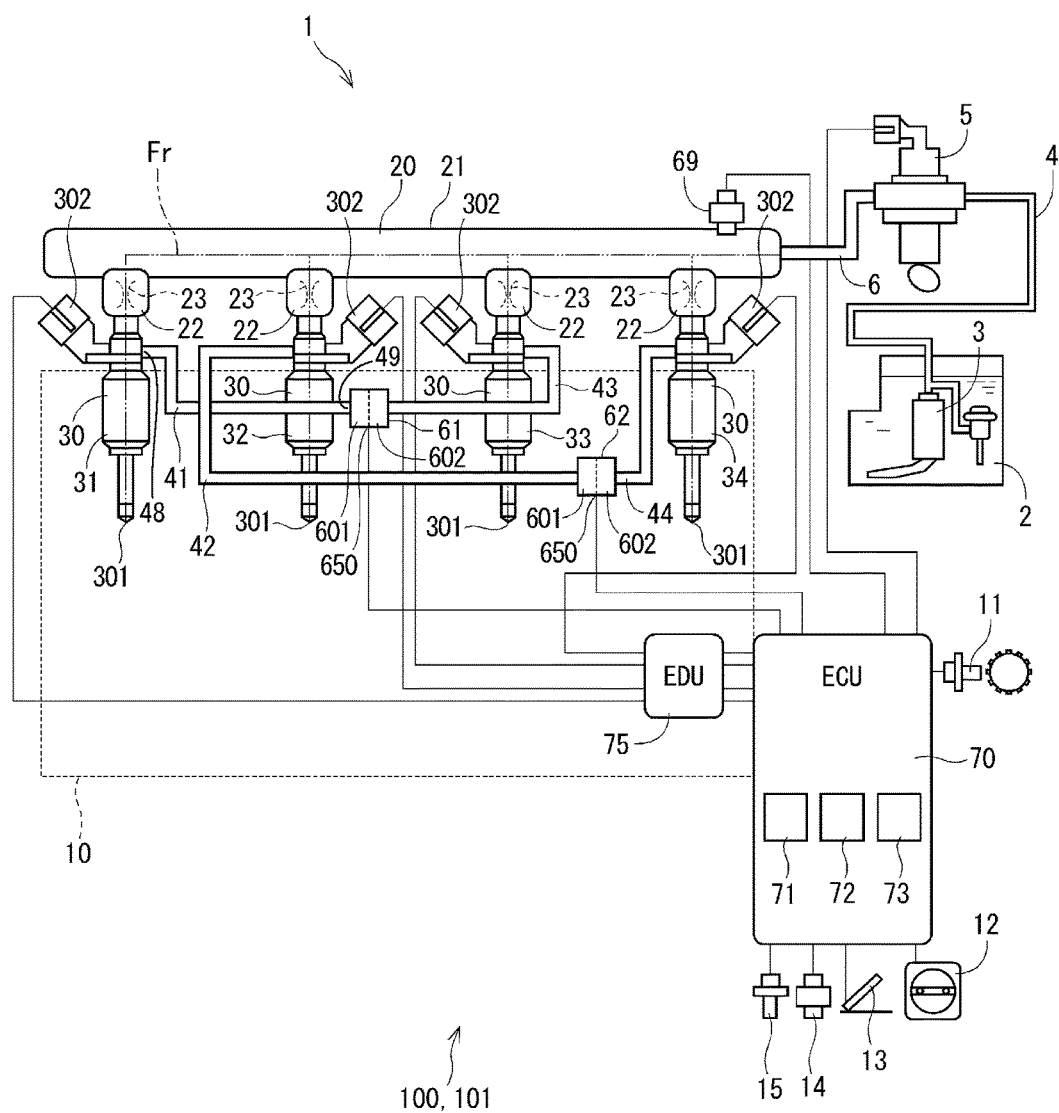
FIG. 7 is a block diagram which illustrates a fuel injection system equipped with a characteristic determining device and a control device according to a third embodiment.

FIG. 7 illustrates the fuel injection system 1 equipped with the characteristic determining device 100 and the control device 101 according to the third embodiment. This embodiment is different in how to connect between the pipes 40 and the first pressure sensors 60 from the second embodiment.

The pipe 43 is joined at the second end 49 to the input port 602 of the first pressure sensor 61, so that the internal injector pressure that is the pressure of fuel in the fuel injector 33 is inputted to the input port 602 of the first pressure sensor 61 through the pipe 43.

The pipe 42 is joined at the second end 49 to the input port 601 of the first pressure sensor 62, so that the internal injector pressure that is the pressure of fuel in the fuel injector 32 is inputted to the input port 601 of the first pressure sensor 62 through the pipe 42.

Other arrangements of the third embodiment are identical with those of the second embodiment, and explanation thereof in detail will be omitted here.

Fourth Embodiment

Figure 8:
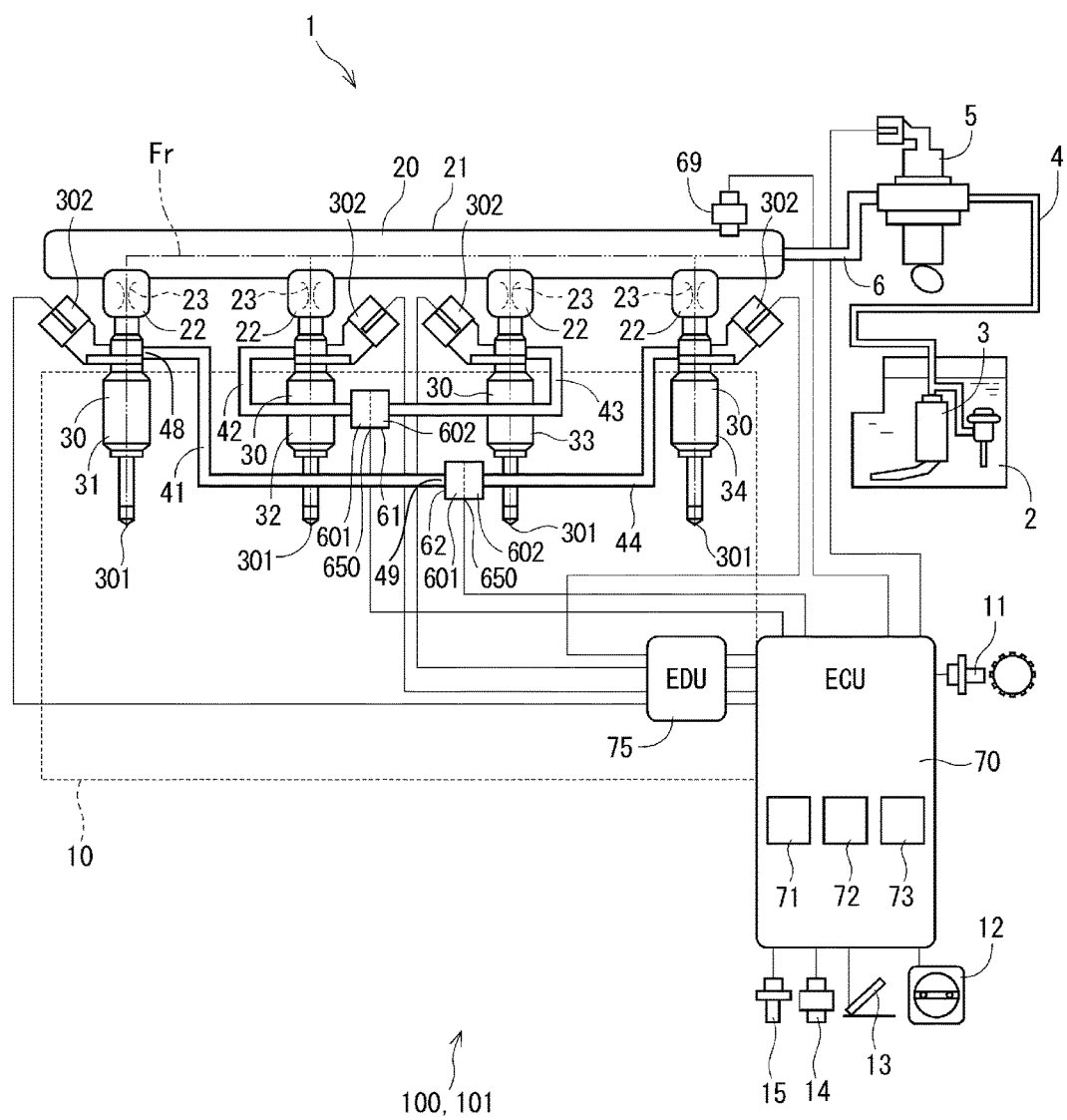
FIG. 8 is a block diagram which illustrates a fuel injection system equipped with a characteristic determining device and a control device according to a fourth embodiment.

FIG. 8 illustrates the fuel injection system 1 equipped with the characteristic determining device 100 and the control device 101 according to the fourth embodiment. This embodiment is different in how to connect between the pipes 40 and the first pressure sensors 60 from the second and third embodiments.

The pipe 44 is joined at the second end 49 to the input port 602 of the first pressure sensor 61, so that the internal injector pressure that is the pressure of fuel in the fuel injector 34 is inputted to the input port 602 of the first pressure sensor 61 through the pipe 44.

The pipes 42 and 43 are joined at the second ends 49 to the input ports 601 and 602 of the first pressure sensor 62, respectively, so that the internal injector pressures that are the pressure of fuel in the fuel injectors 32 and 33 are inputted to the input ports 601 and 602 of the first pressure sensor 62 through the pipes 42 and 43.

Other arrangements of the fourth embodiment are identical with those of the second and third embodiments, and explanation thereof in detail will be omitted here.

Fifth Embodiment

Figure 9:
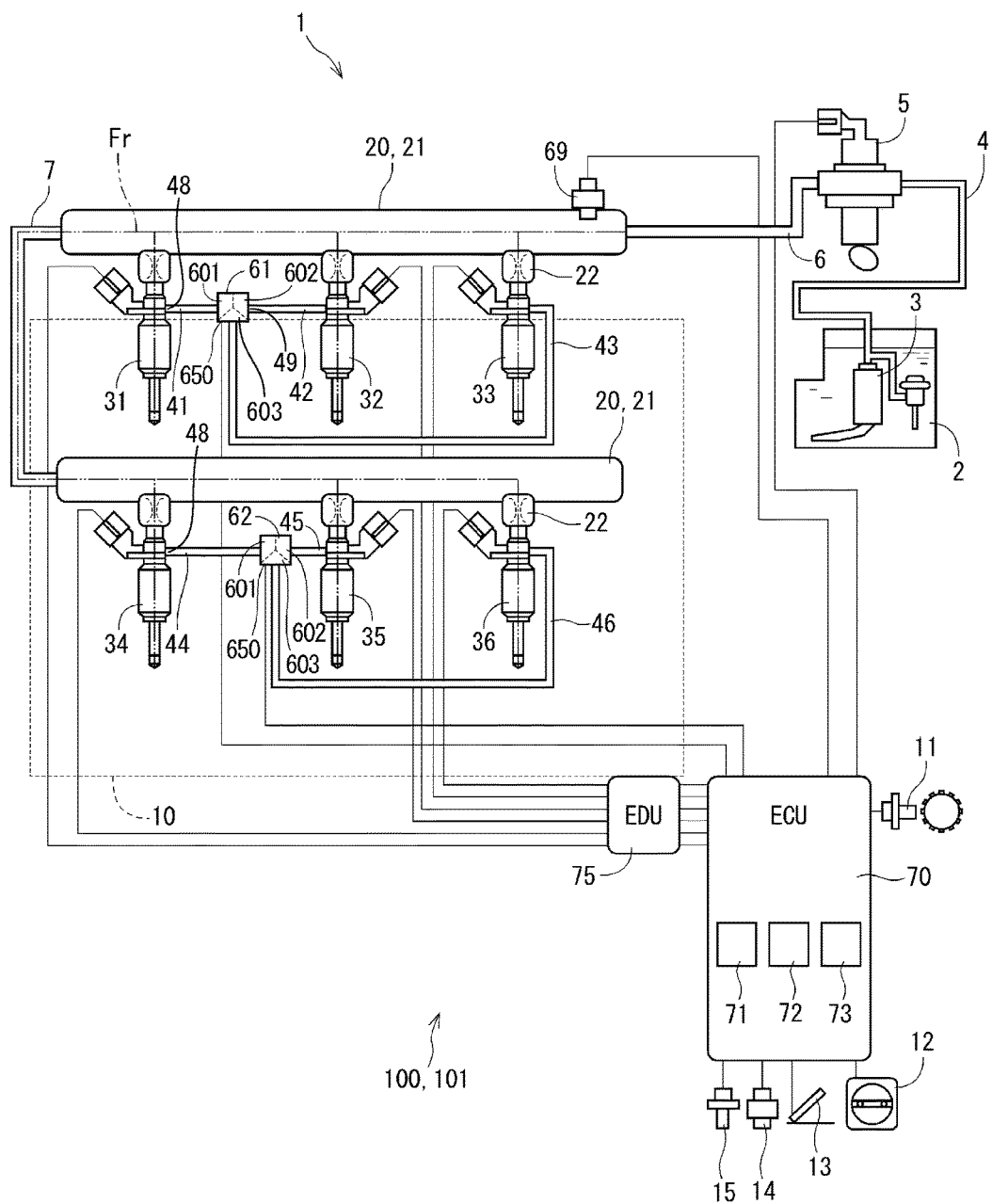
FIG. 9 is a block diagram which illustrates a fuel injection system equipped with a characteristic determining device and a control device according to a fifth embodiment.

FIG. 9 illustrates the fuel injection system 1 equipped with the characteristic determining device 100 and the control device 101 according to the fifth embodiment. This embodiment is different in arrangement of the delivery pipes 20, the pipes 40, and the first pressure sensors 60 from the first embodiment.

The engine 10 of this embodiment with which the characteristic determining device 100 and the control device 101 are used is designed as a V-type six-cylinder engine equipped with two banks of three cylinders.

The fuel injection system 1 has the two delivery pipes 20 one for each of the two banks of the cylinders of the engine 10. The delivery pipes 20 have the pipe bodies 21 connected at ends thereof together through the pipe 7. In other words, the insides of the delivery pipes 20 communicate with each other through the pipe 7.

The second pressure sensor 69 is installed in one of the delivery pipes 20 to which the pipe 6 extending from the high-pressure pump 5 is directly joined.

Each of the delivery pipes 20 is equipped with three cups 22. A total of six cups 22 are, therefore, provided one for each of the fuel injectors 30. In other words, each of the fuel injectors 30 is joined to one of the delivery pipes 20 through a corresponding one of the cups 22. The six injectors 30 are installed one in each of the six cylinders of the engine 10. The fuel injectors 30 will also be denoted by numerals 31, 32, 33, 34, 35, and 36 for the sake of ease of explanation.

The fuel injectors 31, 32, and 33 are joined to one of the delivery pipes 20 to which the pipe 6 extending from the high-pressure pump 5 is directly connected. The fuel injectors 34, 35, and 36 are joined to the other delivery pipe 20.

The fuel injection system 1 is equipped with the six pipes 40 which will also be denoted by numerals 41, 42, 43, 44, 45, and 46 for the sake of ease of explanation. The pipes 41, 42, 43, 44, 45, and 46 have the first ends 48 connected to the fuel injectors 31, 32, 33, 34, 35, and 36, respectively.

The fuel injection system 1 of this embodiment is equipped with two first pressure sensors 60 which will also be denoted by numerals 61 and 62 for the sake of ease of explanation.

Figure 10:
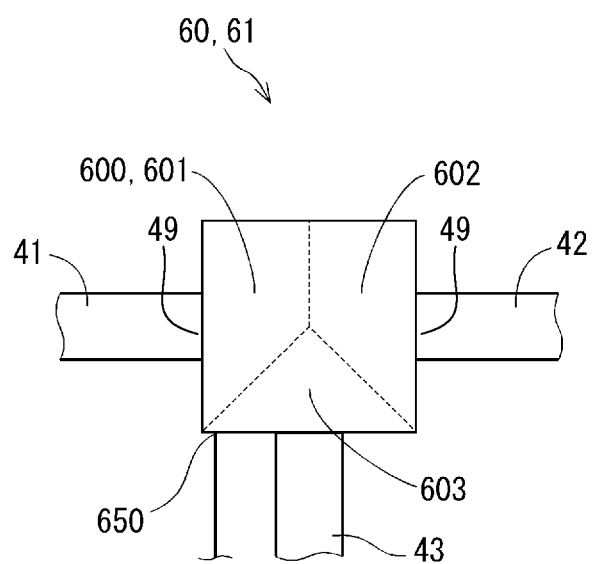
FIG. 10 is a partial schematic view which illustrates an internal structure of a first pressure sensor installed in the characteristic determining device of FIG. 9.

The pipes 41, 42, and 43 are, clearly illustrated in FIG. 10, joined at the second ends 49 thereof to the first pressure sensor 61. The first pressure sensor 61 has formed therein three hydraulically isolated chambers each of which is joined to one of the pipes 41, 42, and 43. In other words, the pipes 41, 42, and 43 do not communicate with each other, so that the fuel does not flow from one of the pipes 41, 42, and 43 to another. When the characteristic determining device 100 is in operation, all the pipes 40 are fully filled with the fuel.

The first pressure sensor 61 is equipped with three input ports 600 and one output port 650. The input ports 600 will also be denoted by numerals 601, 602, and 603 for the sake of ease of explanation.

The input ports 601, 602, and 603 are, like in the above embodiments, defined by the isolated inner chambers of the first pressure sensor 61, respectively. The input ports 601, 602, and 603 communicate with the second ends 49 of the pipes 41, 42, and 43, respectively, so that internal injector pressures of the fuel injectors 31, 32, and 33 are inputted to the input ports 601, 602, and 603 through the pipes 41, 42, and 43, respectively.

Like the first pressure sensor 61, the first pressure sensor 62 has formed therein three hydraulically isolated chambers each of which is joined to one of the pipes 44, 45, and 46. In other words, the pipes 44, 45, and 46 do not communicate with each other, so that the fuel does not flow from one of the pipes 44, 45, and 46 to another.

The first pressure sensor 62 is, like the first pressure sensor 61, equipped with three input ports 600 (601, 602, and 603) and one output port 650.

The input ports 601, 602, and 603 are defined by the isolated inner chambers of the first pressure sensor 62, respectively. The input ports 601, 602, and 603 communicate with the second ends 49 of the pipes 44, 45, and 46, respectively, so that internal injector pressures of the fuel injectors 34, 35, and 36 are inputted to the input ports 601, 602, and 603 through the pipes 44, 45, and 46, respectively.

The fuel injection system 1 of this embodiment is, as described above, equipped with the two first pressure sensors 60 one for every three of the pipes 40.

The pipes 41 to 46 have the same length between the first ends 48 (i.e., the fuel injectors 30) and the second ends 49 (i.e., the first pressure sensors 60).

The output ports 650 of the first pressure sensors 61 and 62 are electrically connected to the ECU 70. Each of the output ports 650 works to output a signal indicative of a pressure difference ΔP among the input ports 601, 602, and 603 to the ECU 70.

Specifically, if levels of pressure inputted to the input ports 601, 602, and 603 are represented by P1, P2, and P3, respectively, the pressure difference ΔP is given by one of the following equations.

$$\Delta P = P1 - (P2+P3)/2 \text{ when } P2=P3 \qquad (6)$$

$$\Delta P = P2 - (P1+P3)/2 \text{ when } P1=P3 \qquad (7)$$

$$\Delta P = P1 - (P1+P2)/2 \text{ when } P1=P1 \qquad (8)$$

Each of the first pressure sensors 60 is, therefore, a differential pressure sensor and works to output a signal indicating a difference in internal injector pressure among the fuel injectors 30 to which the pipes 40 are joined at the first ends 48.

The output port 650 of each of the first pressure sensors 60 produces a signal indicating a result of comparison of a change in one of three pressure levels inputted to the input ports 600 with the other pressure levels.

In this embodiment, the controller 73 of the ECU 70 controls operation timings of the fuel injectors 30 so that the injection timings do not overlap each other, thus avoiding two or more of the fuel injectors 30 simultaneously spraying fuel.

Other arrangements of the fifth embodiments are identical with those in the first embodiment. The characteristic determiner 71, the offset corrector 72, and the controller 73 are identical in operation with those in the first embodiment.

The fuel injection system 1 of this embodiment is, as described above, equipped with the six pipes 40 one for each of the fuel injectors 30 and the two first pressure sensors 60. Each of the first pressure sensors 60 is connected to the second ends 49 of every three of the pipes 40. These arrangements result in a simplified structure of the fuel injection system 1 as compared with conventional structures in which a plurality of pressure sensors are used one for each fuel injector, which enables the manufacturing costs of the fuel injection system 1 to be reduced.

Sixth Embodiment

Figure 11:
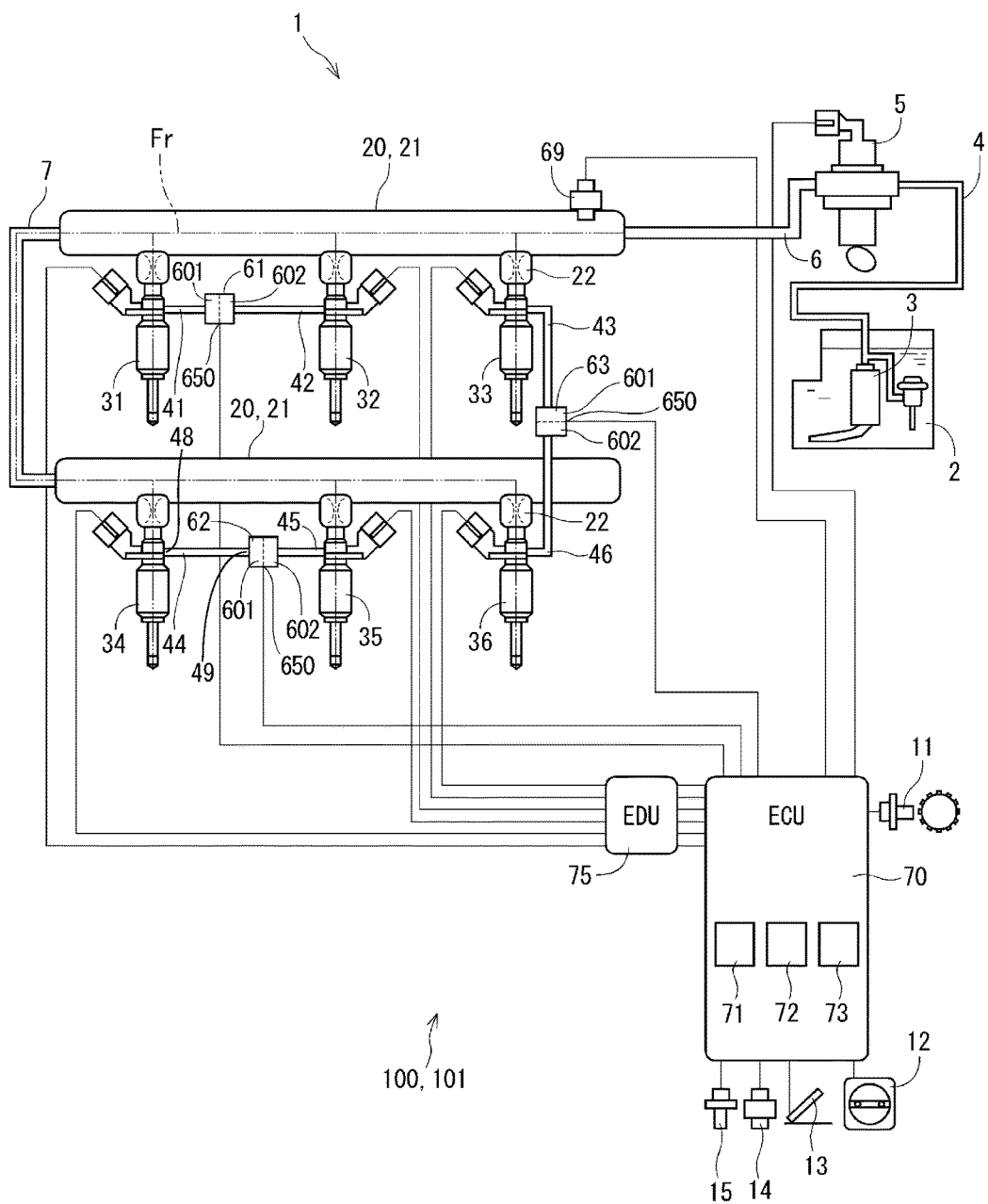
FIG. 11 is a block diagram which illustrates a fuel injection system equipped with a characteristic determining device and a control device according to a sixth embodiment.

FIG. 11 illustrates the fuel injection system 1 equipped with the characteristic determining device 100 and the control device 101 according to the sixth embodiment. This embodiment is a modification of the fifth embodiment in FIG. 9 and different therefrom in arrangement of the first pressure sensors 60 and connection between the pipes 40 and the first pressure sensors 60.

Specifically, the fuel injection system 1 of this embodiment is equipped with three first pressure sensors 60 which will also be denoted by numerals 61, 62, and 63 for the sake of ease of explanation.

The first pressure sensors 60 each have the same structure as that discussed in the second, third, and forth embodiments. Specifically, each of the first pressure sensors 60 has the two input ports 601 and 602.

The pipes 41 and 42 are connected at the second ends 49 thereof to the input ports 601 and 602 of the first pressure sensor 61, so that pressure of fuel in the fuel injectors 31 and 32 are inputted to the input ports 601 and 602 of the first pressure sensor 61 through the pipes 41 and 42.

The pipes 44 and 45 are connected at the second ends 49 thereof to the input ports 601 and 602 of the first pressure sensor 62, so that pressure of fuel in the fuel injectors 34 and 35 are inputted to the input ports 601 and 602 of the first pressure sensor 62 through the pipes 44 and 45.

The pipes 43 and 46 are connected at the second ends 49 thereof to the input ports 601 and 602 of the first pressure sensor 63, so that pressure of fuel in the fuel injectors 33 and 36 are inputted to the input ports 601 and 602 of the first pressure sensor 63 through the pipes 43 and 46.

The fuel injection system 1 of this embodiment is, as described above, equipped with the three first pressure sensor 60 and the pipes 40 every two of which are connected to one of the first pressure sensors 60.

The pipes 41 to 46 have the same length between the first ends 48 (i.e., the fuel injectors 30) and the second ends 49 (i.e., the first pressure sensors 60).

Other arrangements of the sixth embodiment are identical with those in the fifth embodiment.

The fuel injection system 1 of this embodiment is, as described above, equipped with the six pipes 40 one for each of the six fuel injectors 30 and the three first pressure sensors 60. Each of the first pressure sensors 60 is connected to the second ends 49 of every two of the pipes 40. These arrangements result in a simplified structure of the fuel injection system 1 as compared with conventional structures in which a plurality of pressure sensors are used one for each fuel injector, which enables the manufacturing costs of the fuel injection system 1 to be reduced.

Seventh Embodiment

Figure 12:
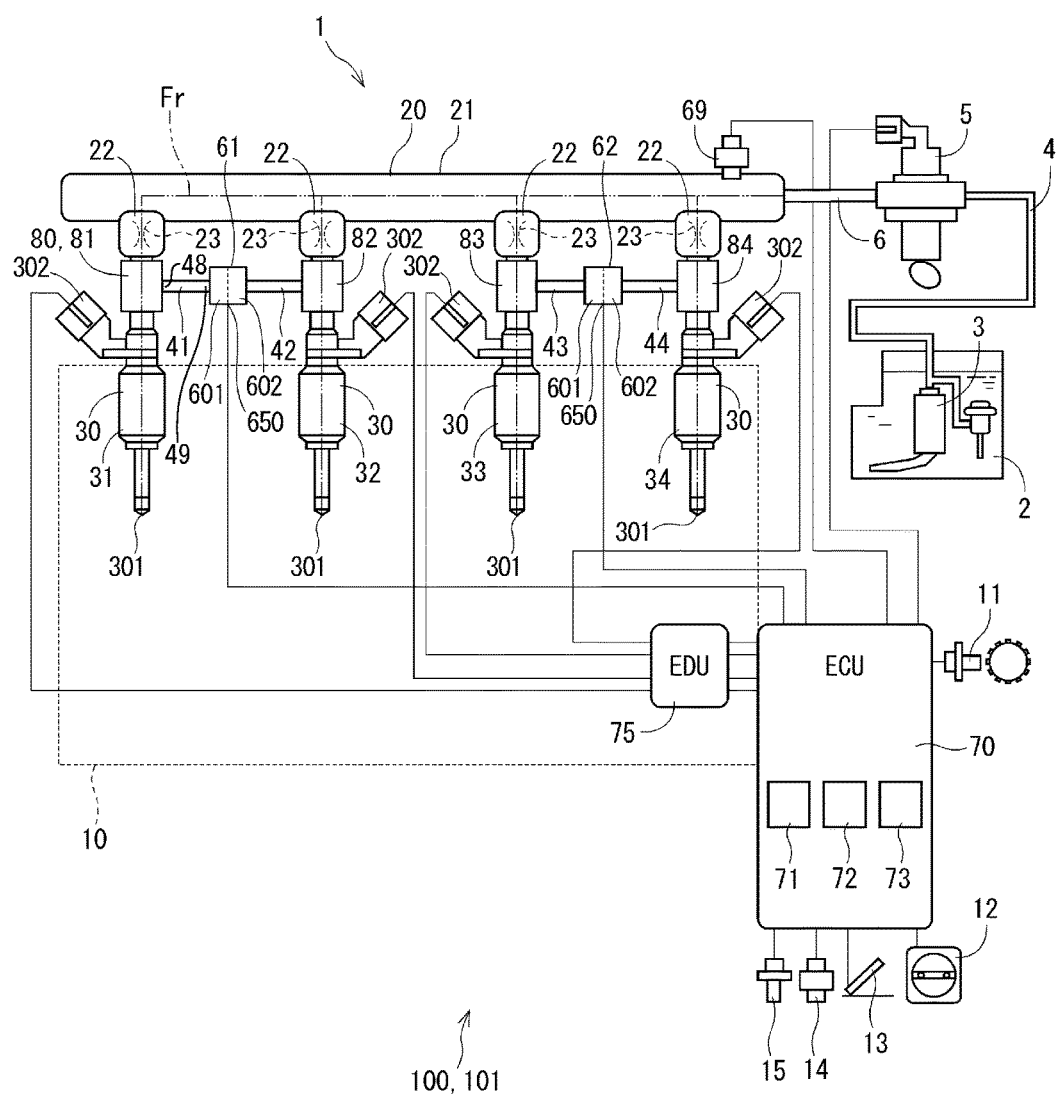
FIG. 12 is a block diagram which illustrates a fuel injection system equipped with a characteristic determining device and a control device according to a seventh embodiment.

FIG. 12 illustrates the fuel injection system 1 equipped with the characteristic determining device 100 and the control device 101 according to the seventh embodiment. This embodiment is different in number of parts from the second embodiment.

The fuel injection system 1 is also equipped with as many connectors 80 as the fuel injectors 30 installed in the engine 10. Specifically, the fuel injection system 1 of this embodiment includes the four connectors 80 which will also be denoted by numerals 81, 82, 83, and 84 for the sake of ease of explanation.

Each of the connectors 80 is made of a hollow metallic cylinder.

The pipe 41 is joined at the first end 48 thereof to an outer wall of the connector 81 to establish fluid communication between insides of the pipe 41 and the connector 81.

The pipe 42 is joined at the first end 48 thereof to an outer wall of the connector 82 to establish fluid communication between insides of the pipe 42 and the connector 82.

The pipe 43 is joined at the first end 48 thereof to an outer wall of the connector 83 to establish fluid communication between insides of the pipe 43 and the connector 83.

The pipe 44 is joined at the first end 48 thereof to an outer wall of the connector 84 to establish fluid communication between insides of the pipe 44 and the connector 84.

In other words, the first pressure sensor 61, the pipes 41 and 42, and the connectors 81 and 82 constitute a sub-assembly. Similarly, the first pressure sensor 62, the pipes 43 and 44, and the connectors 83 and 84 constitute a sub-assembly.

The connector 81 connects between the end of the fuel injector 31 which is farther away from the spray hole 301 and the cup 22 attached to the delivery pipe 20, so that the pressure of fuel in the fuel injector 31 (i.e., the internal injector pressure) is inputted to the input port 601 of the first pressure sensor 61.

The connector 82 connects between the end of the fuel injector 32 which is farther away from the spray hole 301 and the cup 22 attached to the delivery pipe 20, so that the pressure of fuel in the fuel injector 32 is inputted to the input port 602 of the first pressure sensor 61.

The connector 83 connects between the end of the fuel injector 33 which is farther away from the spray hole 301 and the cup 22 attached to the delivery pipe 20, so that the pressure of fuel in the fuel injector 33 is inputted to the input port 601 of the first pressure sensor 62.

The connector 84 connects between the end of the fuel injector 34 which is farther away from the spray hole 301 and the cup 22 attached to the delivery pipe 20, so that the pressure of fuel in the fuel injector 34 is inputted to the input port 602 of the first pressure sensor 62.

Other arrangements of the seventh embodiment are identical with those in the second embodiment.

Feature 1

The fuel injection system 1 of this embodiment is, as described above, equipped with the connectors 80 to which the first ends 48 of the pipes 40 are joined. Each of the connectors 80 establish connection between the end of one of the fuel injectors 30 which is farther away from the spray hole 301 and the delivery pipe 20. The first pressure sensors 60, the pipes 40, and the connectors 80 form the sub-assemblies, thereby eliminating the need for drilling holes in the fuel injectors 30 for connection with the pipes 40, which enhances the versatility of the characteristic determining device 100 and the control device 101.

Modifications

In the above embodiments, the first end 48 of each of the pipes 40 is joined to the end of one of the fuel injectors 30 which is attached to the delivery pipe 20 through the cup 22 and farther away from the spray hole 301, but however, it may alternatively be connected to another portion of the fuel injector 30 which is closer to the spray hole 301 than the end thereof attached to the delivery pipe 20 is. This enhances the pressure measuring accuracy of the first pressure sensor(s) 60.

The number of the first pressure sensors 60 is not limited to that described in the above embodiment as long as at least two of the pipes 40 joined at ends thereof to the fuel injectors 30 are connected to the single first pressure sensor 60. The pipes 40 to be joined to the first pressure sensor(s) 60 may be selected in a way other than that described in the above embodiments.

The orifices 23 which function to restrict a flow of fuel in the fuel path Fr are provided in the respective cups 22, but may alternatively be formed in the fuel injectors 30 or the connectors 80. In this case, the first end 48 of each of the pipes 40 is preferably joined to a portion of the fuel path Fr which is located between the orifice 23 and the spray hole 301.

The fuel injection system 1 may not be equipped with the second pressure sensor 69. As long as the first pressure sensor 60 is engineered to have a measurable range of, for example, 0 to 100 Mpa, and also to determine absolute levels of pressure of fuel in the pipes 40 (i.e., absolute values of the internal injector pressure of the fuel injectors 30), the characteristic determining device 100 is capable of analyzing outputs from the first pressure sensor 60 to determine the fuel injection characteristics of the fuel injectors 30.

The first pressure sensor(s) 60 may alternatively be designed to have an output which is point-asymmetric between the positive pressure side and the negative pressure side.

The pipes 40 connecting with the same first pressure sensor 60 may have lengths different from each other between the first and second ends 49.

Fuel paths extending from the first pressure sensor(s) 60 to the second pressure sensor 69 through the pipes 40 may be designed to have the same length. This reduces a phase difference between pressure pulsations transmitted to the first pressure sensor 60 and the second pressure sensor 69, which enhances the pressure measuring accuracy of the first pressure sensors 60 and the second pressure sensor 69.

The fuel injection system 1 may not be equipped with the offset corrector 72.

The first pressure sensor 60 or the second pressure sensor 69 may alternatively be engineered to have a response frequency of less than 20 kHz.

The fuel injection system 1, as discussed in the first, second, third, fourth, and seventh embodiments, may be engineered to have an assembly of the delivery pipe 20, the fuel injectors 30, the pipes 40, the first pressure sensor(s) 60, and the second pressure sensor 69 which is used for each of two cylinder banks of, for example, a V-type eight-cylinder engine. The pipe bodies 21 of the delivery pipes 20 may be connected together between the cylinder banks to omit one of the two second pressure sensors 69.

The fuel injection system 1, as described above, works to control the operations of the fuel injectors 3 not to spray fuel simultaneously and thus may be used with various types of engines equipped with two or more cylinders.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

What is claimed is:

1. A characteristic determining device for determining fuel injection characteristics of a plurality of fuel injectors working to spray fuel in a delivery pipe into an internal combustion engine, the characteristic determining device comprising:
a plurality of pipes each of which has a length with a first end and a second end and communicates at the first end with an inside of one of the fuel injectors;
a plurality of flow restrictors to restrict flows of the fuel to spray holes of the fuel injectors, wherein each flow restrictor is disposed in a fuel path between the delivery pipe and the spray holes of a respective one of the fuel injectors, wherein the fuel path includes a first section leading to the spray holes of the respective one of the fuel injectors and a second section extending from inside of the delivery pipe to the first section, wherein the first ends of the pipes are joined to the first sections of the respective fuel paths, and wherein joints of the first ends of the pipes to the first sections of the respective fuel paths are located closer to the spray holes than the flow restrictors;
a first pressure sensor to which the second ends of at least two of the pipes are joined and which is responsive to a pressure in each of the at least two of the pipes to output a signal as a function of an internal injector pressure that is a pressure of fuel in a corresponding one of the fuel injectors; and
a microcomputer programmed to:
analyze the signal, as outputted from the first pressure sensor, to determine fuel injection characteristics of the corresponding one of the fuel injectors, wherein:
the delivery pipe has cups, each of which is joined to an end of one of the fuel injectors which is farther away from the spray hole, and
the flow restrictors are disposed in the cups.

2. The characteristic determining device as set forth in claim 1, further comprising an offset corrector which works to correct an offset of the signal outputted from the first pressure sensor when the internal combustion engine is in operation.

3. The characteristic determining device as set forth in claim 1, wherein the first pressure sensor has a response frequency of 20 kHz or more.

4. The characteristic determining device as set forth in claim 1, wherein the fuel injectors are controlled not to spray the fuel simultaneously.

5. The characteristic determining device as set forth in claim 1, further comprising connectors to which the first ends of the pipes are joined and which connects between the delivery pipe and ends of the fuel injectors which are farther away from the spray holes.

6. A characteristic determining device for determining fuel injection characteristics of a plurality of fuel injectors working to spray fuel in a delivery pipe into an internal combustion engine, the characteristic determining device comprising:
a plurality of pipes each of which has a length with a first end and a second end and communicates at the first end with an inside of one of the fuel injectors;
a first pressure sensor to which the second ends of at least two of the pipes are joined and which is responsive to a pressure in each of the at least two of the pipes to output a first signal as a function of an internal injector pressure that is a pressure of fuel in a corresponding one of the fuel injectors;
a second pressure sensor which works to output a second signal indicating an internal pipe pressure that is a pressure of the fuel in the delivery pipe; and
a microcomputer programmed to:
analyze the first signal, as outputted from the first pressure sensor, to determine fuel injection characteristics of the corresponding one of the fuel injectors, and
determine the fuel injection characteristics of the corresponding one of the fuel injectors based on the first signal and the second signals outputted from the first pressure sensor and the second pressure sensor, respectively.

7. The characteristic determining device as set forth in claim 6, wherein the first pressure sensor works to output the first signal as a function of a difference in pressure among the fuel injectors to which the first ends of the pipes are joined.

8. The characteristic determining device as set forth in claim 7, wherein the first signal outputted from the first pressure sensor has a characteristic which is point-symmetrical between a positive pressure side and a negative pressure side.

9. The characteristic determining device as set forth in claim 7, wherein the first pressure sensor has pressure inputs from the pipes leading to the fuel injectors and outputs the first signal as a function of a result of comparison of a change in one of the pressure inputs with others of the pressure inputs.

10. The characteristic determining device as set forth in claim 7, wherein the first pressure sensor is designed to have formed therein isolated inner chambers each of which leads to one of the pipes to obtain a corresponding one of the pressure inputs.

11. The characteristic determining device as set forth in claim 7, wherein the pipes have the same length between the first ends and the second ends.

12. The characteristic determining device as set forth in claim 7, further comprising paths which extend from the first pressure sensor to the second pressure sensor through the pipes and have the same length.

13. The characteristic determining device as set forth in claim 6, further comprising:
fuel paths disposed between the delivery pipe and each of the fuel injectors, the fuel paths each including a first section leading to spray holes of the respective one of the fuel injectors and a second section extending from inside of the delivery pipe to the first section, pressure in each of the first sections dropping in response to spraying of the fuel from a corresponding one of the fuel injectors, wherein
the first ends of the pipes are joined to the first sections of the fuel paths.

14. The characteristic determining device as set forth in claim 6, further comprising an offset corrector which works to correct an offset of the first signal outputted from the first pressure sensor when the internal combustion engine is in operation.

15. The characteristic determining device as set forth in claim 6, wherein the first pressure sensor has a response frequency of 20 kHz or more.

16. The characteristic determining device as set forth in claim 6, wherein the fuel injectors are controlled not to spray the fuel simultaneously.

17. The characteristic determining device as set forth in claim 6, further comprising connectors to which the first ends of the pipes are joined and which connects between the delivery pipe and ends of the fuel injectors which are farther away from the spray holes.

18. A control device comprising:
- a characteristic determining device for determining fuel injection characteristics of a plurality of fuel injectors working to spray fuel in a delivery pipe into an internal combustion engine, the characteristic determining device including:
  - (a) a plurality of pipes each of which has a length with a first end and a second end and communicates at the first end with an inside of one of the fuel injectors;
  - (b) a plurality of flow restrictors to restrict flows of the fuel to spray holes of the fuel injectors, wherein each flow restrictor is disposed in a fuel path between the delivery pipe and the spray holes of a respective one of the fuel injectors, wherein the fuel path includes a first section leading to the spray holes of the respective one of the fuel injectors and a second section extending from inside of the delivery pipe to the first section, wherein the first ends of the pipes are joined to the first sections of the respective fuel paths, wherein joints of the first ends of the pipes to the first sections of the respective fuel paths are located closer to the spray holes than the flow restrictors, the delivery pipe has cups, each of which is joined to an end of one of the fuel injectors which is farther away from the spray hole, and the flow restrictors are disposed in the cups;
  - (c) a first pressure sensor to which the second ends of at least two of the pipes are joined and which is responsive to a pressure in each of the at least two of the pipes to output a signal as a function of an internal injector pressure that is a pressure of fuel in a corresponding one of the fuel injectors; and
  - (d) a microcomputer programmed to analyze the signal, as outputted from the first pressure sensor, to determine fuel injection characteristics of a corresponding one of the fuel injectors, and to control spraying operations of the corresponding one of the fuel injectors based on the fuel injection characteristics derived by the characteristic determining device.

19. The control device as set forth in claim 18, wherein the microcomputer controls the operations of the fuel injectors to have injection durations which are out of coincidence with each other.

20. A control device comprising:
- a characteristic determining device for determining fuel injection characteristics of a plurality of fuel injectors working to spray fuel in a delivery pipe into an internal combustion engine, the characteristic determining device including:
  - (a) a plurality of pipes each of which has a length with a first end and a second end and communicates at the first end with an inside of one of the fuel injectors;
  - (b) a first pressure sensor to which the second ends of at least two of the pipes are joined and which is responsive to a pressure in each of the at least two of the pipes to output a first signal as a function of an internal injector pressure that is a pressure of fuel in a corresponding one of the fuel injectors;
  - (c) a second pressure sensor which works to output a second signal indicating an internal pipe pressure that is a pressure of the fuel in the delivery pipe; and
  - (d) a microcomputer programmed to: (i) analyze the first signal, as outputted from the first pressure sensor, to determine fuel injection characteristics of a corresponding one of the fuel injectors, and (ii) determine the fuel injection characteristics of the corresponding one of the fuel injectors based on the first signal and second signal outputted from the first pressure sensor and the second pressure sensor, respectively, and to control spraying operations of the corresponding one of the fuel injectors based on the determined fuel injection characteristics.

21. The control device as set forth in claim 20, wherein the microcomputer controls the operations of the fuel injectors to have injection durations which are out of coincidence with each other.

* * * * *